Aug. 3, 1965 G. W. FLOYD 3,198,935

RECORD READER

Filed Dec. 27, 1960 2 Sheets-Sheet 1

INVENTOR.
GEORGE W. FLOYD
BY Christie, Parker & Hale
ATTORNEYS.

INVENTOR.
GEORGE W. FLOYD
BY Christie, Parker & Hale
ATTORNEYS.

United States Patent Office 3,198,935
Patented Aug. 3, 1965

3,198,935

RECORD READER

George W. Floyd, Los Angeles, Calif., assignor, by mesne assignments, to Ex-Cell-O Corporation, Detroit, Mich., a corporation of Michigan Filed Dec. 27, 1960, Ser. No. 78,747
7 Claims. (Cl. 235—61.11)

This invention relates to record readers and, more particularly, to reading control arrangements for information tapes. One specific embodiment of the invention contemplates a timing control circuit for photocell tape readers.

A common form of record member for use in digital control arrangements and the like is a perforated tape whereon binary coded information may be recorded in terms of the presence or absence of a perforation to thereby provide an on-off type of output indication. In order to provide a tape reader that is commercially acceptable, the reader must be capable of use or be readily adapted for use with information tapes having different light transmitting properties. Information tapes are commonly referred to as "paper" tapes, but refer in general to perforated tapes of all light transmitting properties. To this end, the information "paper" tapes that are presently in use range from an opaque tape, as exemplified by the aluminum Mylar tape, or purely paper tapes having varying degrees of light transmitting properties. In all of these types of tapes the binary coded information generally is arranged whereby groups of perforations are transversely aligned across the tape and each group is spaced apart a preselected distance. In some photocell tape readers wherein paper tapes having partial light transmitting characteristics are employed, the sensitivity of the light sensing elements relative to the amount of light that is transmitted through the unperforated portions of the paper, i.e., spaces between perforations, causes the reading circuitry to continuously provide an output indication and thereby is unable to discriminate between a perforated area and an unperforated one. In addition, if the reading circuitry is adapted for an information tape having particular light transmitting properties, modifications are continuously required for tapes of varying light transmitting properties. An economical and reliable tape reader is therefore desired that may be used with all the various types of "paper" tapes that are available.

The present invention provides an improved and economical record reader particularly adapted for reliably reading only the recorded information from an information tape. The record reader is usable with "paper" tapes having varying light transmitting characteristics without requiring any substantial modifications of the reading circuitry. The record reader includes a control circuit arrangement for providing all information signals comprising an information group substantially simultaneously in response to the combination of a timing signal and a detected information signal related to a recorded information mark or perforation.

In a specific embodiment of the invention an information "paper" tape includes the usual channel having sprocket or feed holes therein employed as a timing channel for a plurality of information channels arranged coextensively therewith. The binary coded information is recorded in channels by means of the presence or absence of a perforation with each group of perforations substantially aligned with a timing perforation transversely of the tape. A plurality of sensing elements corresponding to each information channel and the timing channel for generating an electrical signal in response to a light signal impinging thereon by means of the perforations in these channels is mounted on one side of the tape with the light source mounted on the opposite side of said tape for directing light onto the tape. The light sensing elements are each provided with a separate amplifying circuit and which circuits are all arranged to be normally nonconductive and to be rendered conductive only when a light signal has been received by any one of the amplifiers and simultaneously has been conditioned by a triggering signal derived from the timing channel. The light sensing elements are arranged with impedance means in parallel circuit relationship with each of the amplifying elements and which impedance means is provided with a biasing voltage whereby a light threshold level is defined to prevent the amplifiers from being rendered conductive except at the desired reading intervals. For this purpose, the sensing element for the feed track is arranged with a trigger circuit means which is adapted to be responsive to the timing sensing element to be switched into a conductive state whereby all of the information amplifiers are conditioned to be responsive to the information signals provided by their corresponding light sensing elements. In this fashion, all of the information signals corresponding to a tape perforation will cause an amplifier to become simultaneously conductive and those amplifying elements which do not receive an information signal from their sensing elements will not be rendered conductive.

The triggering circuit of the invention is in the form of a Schmitt-type arrangement employing a pair of transistor elements. The input circuit for these transistor elements is arranged in common with a Zener diode to provide a substantially constant input bias for the trigger circuit at all times including before, after, and during the triggering or switching of the circuit so that no tendency to oscillate occurs.

These and other features of the present invention may be more fully appreciated when considered in the light of the following specification and drawings, in which.

Figures 1, 2, 3:
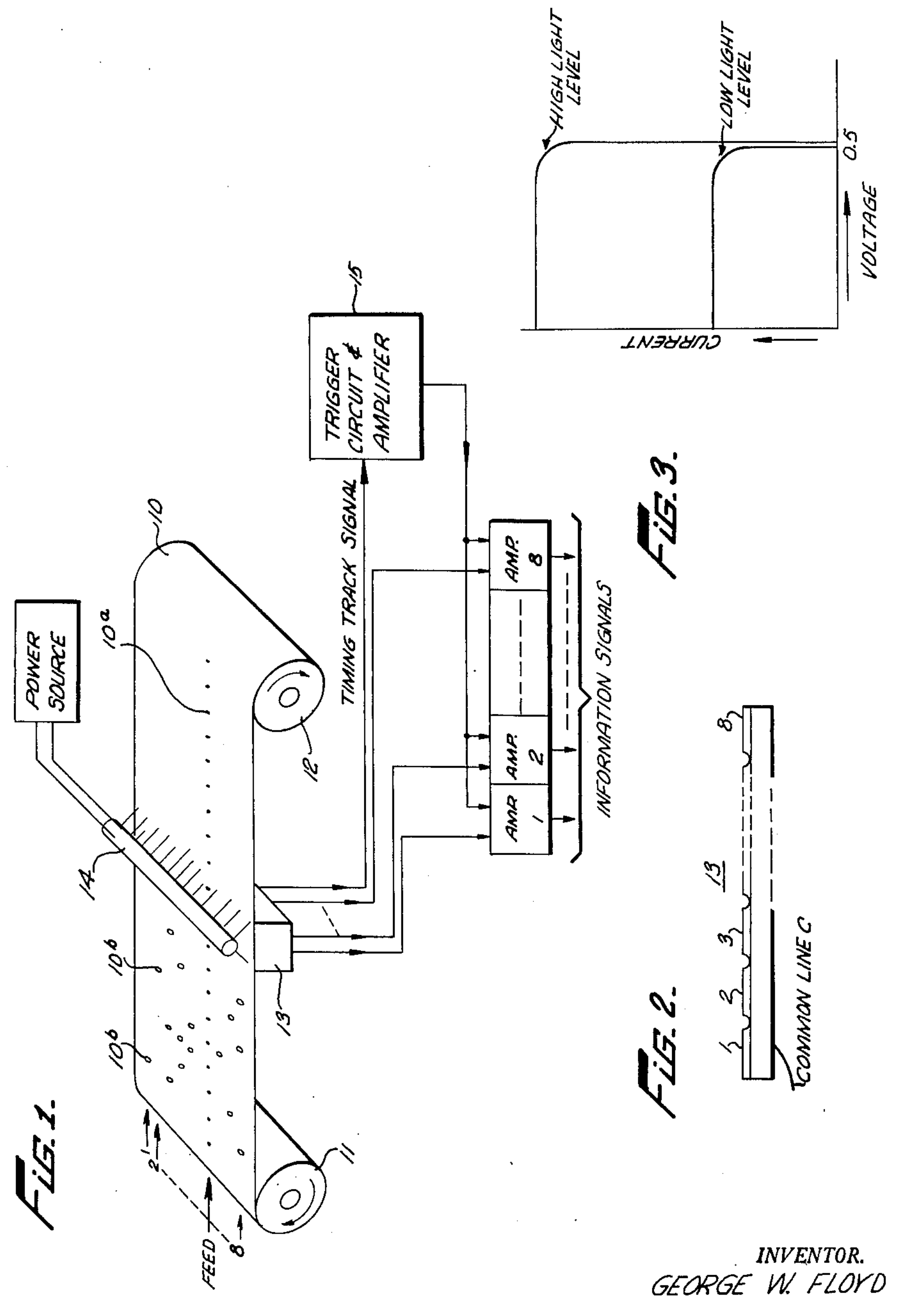
FIG. 1 is a schematic representation of a record reader embodying the invention.
FIG. 2 is an elevational view of a typical sensing element for use in the arrangement of FIG. 1.
FIG. 3 is a graphical illustration of a current versus voltage characteristic under different light levels for the sensing element of FIG. 2.

Now referring to FIG. 1, the general organization of the tape reader will be described. An information tape 10 is shown mounted between a supply reel 11 and a take-up reel 12 with a sensing means 13 mounted therebetween. The sensing means 13 is shown mounted below the information tape 10 and aligned with a light source 14 mounted on the opposite side thereof. The information tape 10 is shown with a pulrality of sprocket feed holes arranged substantially centrally of the tape and having a preselected spacing. The sprocket feed holes are identified by the reference character 10$^a$ and which feed holes will be referred to for the purposes of this invention as timing perforations arranged in a timing channel. The information tape 10 also includes information perforations for recording binary coded information in terms of the presence or absence of a perforation in a particular information channel. The information perforations are indentified by the reference character 10$^b$ and are arranged in transverse alignment with a timing perforation 10$^a$ whereby each group of information perforations includes a timing perforation in alignment therewith. The exemplary tape 10 includes eight information channels and the single timing channel.

The sensing means 13 comprises a plurality of sensing elements, one sensing element for each information channel and one for the timing channel, and which sensing elements are capable of providing an electrical output indication or current in response to light impinging thereon from the source 14. Each of the information sensing elements is coupled to a separate amplifier shown and identified as the amplifiers 1, 2, 3, . . . 8, corresponding to the the eight information channels recorded on the tape. The timing signal derived from the timing track is coupled to a trigger circuit and amplifier 15 which, in turn, is also coupled to control the input circuits of each of the amplifiers 1 through 8. The timing track signal is proportioned and arranged to cause the trigger circuit to be switched in responce thereto and to condition each of the information amplifiers to be conductive only if at this same time they have received an information signal from the corresponding sensing elements. In this fashion, all of the amplifiers are conditioned to be conductive substantially simultaneously whereby the pattern of perforations recorded on the information tape 10 is reproduced in terms of electrical signals or lack thereof at the outputs of the corresponding information amplifiers, that is, the information signals from the amplifiers are in the form of an on-off type of signal.

Before further describing the control arrangement of the present invention, an examination of the particular type of sensing element that is utilized in the invention will be necessary. The sensing element shown in FIG. 2 is representative of a photovoltaic cell that is commercially available from the Hoffman Electronics Company of Los Angeles, California and is commercially indentified as the Hoffman HPC–9–01 photovoltic read-out cell. The read-out cell is physically arranged as a single unit with a plurality of isolated sensing elements defined thereon, one for each information channel and one for the timing channel, therefore, nine sensing elements are necessary for the particular arrangement shown in FIG. 1. Each sensing element is arranged to receive the light transmitted from a corresponding tape channel and is further arranged with a common layer C shown below the separate light sensing elements or portions and which layer functions as a common line for all of the elements including the timing channel sensing element. The current versus voltage characteristic of the photovoltaic elements is shown in FIG. 3 under the two extremes of light levels. It should be noted that the characteristic of the cells is that the current decreases with increases in voltage, although not linearly, and that the voltage across the cell for the two extremes of light levels is approximately the same or in the neighborhood of 0.5 volt.

Figure 4:
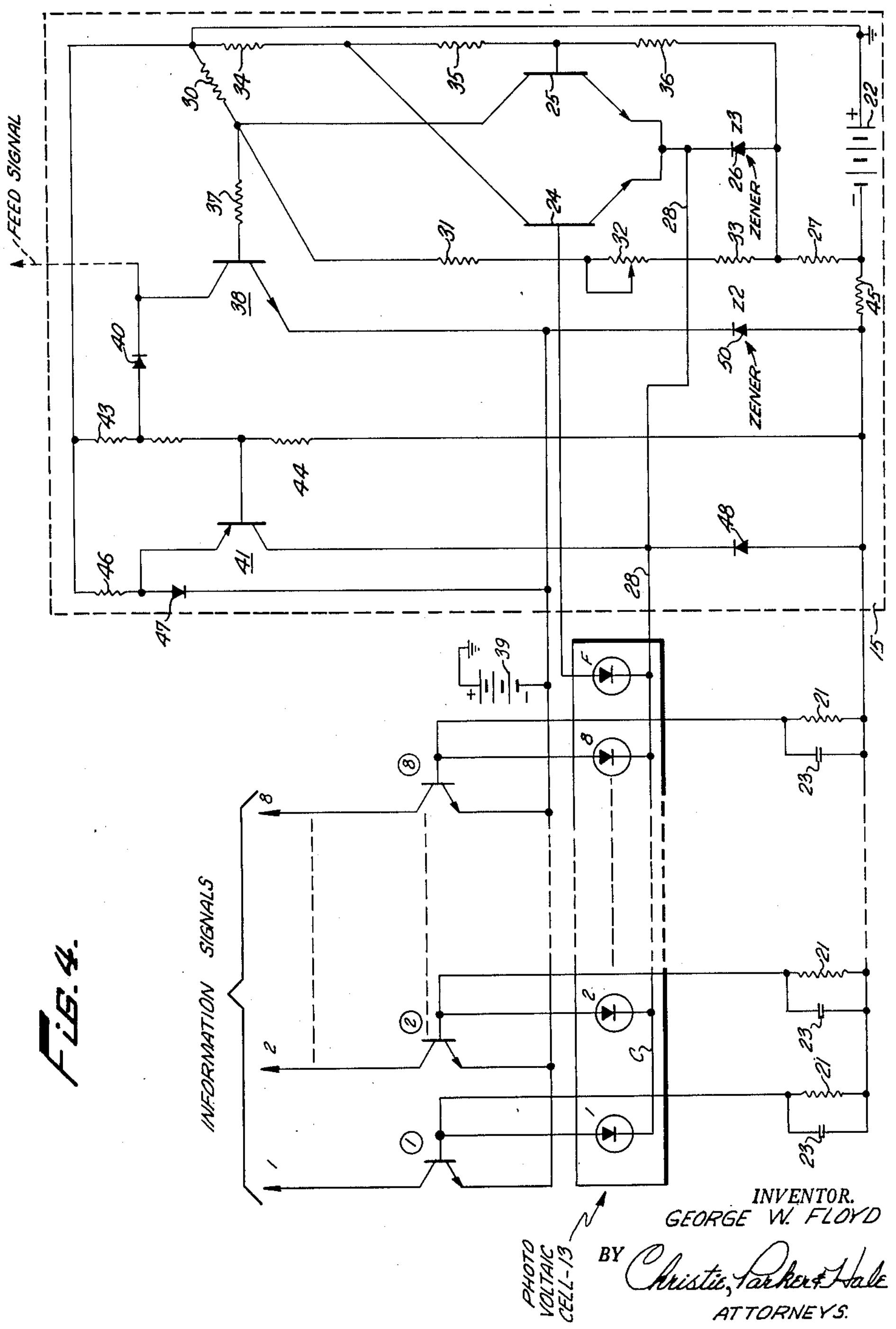
FIG. 4 is a schematic representation of the timing control circuit shown in FIG. 1.

Now, referring to FIG. 4, the detailed circuit arrangement of the timing control circuit of the invention will be described. It should be noted at the outset that the sensing element 13 is illustrated as a photovoltaic cell and is represented by the conventional symbol of a diode enclosed in a circle but physically is arranged as shown in FIG. 2. The common line for all the sensing elements or cells is similarly identified in FIGS. 2 and 4 by the reference letter C. The individual sensing elements are identified in FIG. 4 as the elements 1, 2, 3, . . . 8 to correspond with the information amplifiers 1 through 8 and with the timing sensing element identified by the letter F. Each of the sensing elements 1 through 8 are coupled into the input circuit of a separate amplifying element. In the particular circuit arrangement shown, the amplifiers are in the form of a transistor amplifier circuit with the anode electrode for the photovoltaic cells being connected directly to the base electrode of the corresponding transistor amplifier. The collector electrodes of each of these information channel amplifiers 1 through 8 function as the output circuits therefor. The emitter circuits for these information amplifiers 1 through 8 are all connected in common with the trigger circuit and amplifier 15 and the negative terminal of the battery 39, as will be discussed more fully hereinafter.

Each of the amplifiers 1 through 8 and the associated control networks are arranged and function in the same fashion and therefore only one such amplifier circuit need be examined. To this end, it should be noted that a sensing element is connected to the base electrode of an information amplifier in parallel circuit relationship with a biasing resistor 21 having its opposite end connected to a source of negative potential, shown as a battery 22. The resistor 21 is further arranged in parallel circuit relationship with a capacitor 23 connected across the opposite terminals thereof. This capacitor 23 has been found necessary to prevent the appearance of output pulses during trigger or switching time of the circuit relative to the amount of light impinging on the sensing elements.

An important feature of the present invention is the provision of a biasing voltage by means of the resistive impedance provided by the resistor 21 for each of the sensing elements to provide a threshold operating point relative to the amount of light impinging on the sensing elements to prevent erroneous output indications. The voltage developed across the resistor 21 essentially backbiases the associated sensing element to a predetermined potential and therefore controls the light level that is necessary before the sensing element is effective to control the conduction of the corresponding information amplifier. For example, if "paper" tape having good light transmitting property is employed, the current generated by the sensing elements is sufficient to cause the amplifier to be continuously conductive. With the provision of the threshold level, however, this stray light level is rendered ineffective since sufficient current must be first generated to overcome the back bias before the presence of the light signal will produce a change in potential leading to the conduction of the amplifier circuit. This back-biasing potential and the resistor 21 is, therefore, proportioned relative to "paper" tapes that have the best light transmitting properties, such as the "pink paper" tape to allow the sensing element to be effective only when light impinges thereon by means of a recorded perforation on the "pink paper" tape. This signal alone, however, will not cause the information amplifier to become conductive, as will be discussed more fully hereinafter.

The trigger circuit 15 is a Schmitt-type of trigger which, in this instance, utilizes a pair of transistors 24 and 25 arranged with their emitter electrodes in common with a Zener diode 26. The cathode of the Zener diode is connected to the emitter electrodes, while the anode thereof is connected to the negative terminal of the battery 22 by means of a resistor 27. It should be noted that the provision of the Zener diode 26 provides a constant voltage return with respect to the emitters of the transistors 24 and 25 for the resistors 32, 33, and 36. This then provides a constant input bias before, after, and during switching or triggering time so that no tendency of the circuit to oscillate occurs. The common junction of the emitter for transistors 24 and 25 is coupled by means of the lead 28 to the common layer C of the photovoltaic cells. The input circuit, or, in this case, the base circuit of the transistor 24 is connected directly to the anode of the timing sensing element F. The base electrode of the transistor 24 is further coupled between the positive and negative terminals of the battery 22 by means of the voltage dividing circuit comprising the series resistors 30, 31, 32, and 33, the latter of which is connected to the resistor 27. The base-collector circuit for the transistor 25 is also arranged with a voltage dividing network coupled between the terminals of the battery 22 by means of the resistor 27 and which network includes the series resistors 34, 35, and 36, the latter of which is connected in common with the junction of the resistor 33 and Zener diode 26. The collector electrode for the transistor 24 is coupled to the positive terminal of the resistor 35 or the junction between resistors 34 and 35 while the collector electrode for the transistor 25 is coupled to the negative terminal of the resistor 30 and, by means of a resistor 37, to the base electrode for the transistor amplifier 38.

The emitter electrode for the transistor 38 is coupled in common with each of the emitters for the information amplifiers 1 through 8 and to the negative terminal of a battery 39, having its other terminal connected to ground. The collector or output electrode for the transistor 38 is coupled by means of a diode 40 to the base circuit for another transistor amplifier-inverter 41. The cathode of the diode 40 is connected to the collector electrode of the transistor 38, while the anode thereof is connected in parallel circuit relationship with a resistor 42 coupled to the base electrode of the transistor 41 and to a resistor 43. The free end of the resistor 43 is directly connected to the positive terminal of the battery 22. A resistor 44 is connected to the base of transistor 41 in common with the resistor 42 and to the negative terminal of the battery 22 by means of a series resistor 45. The emitter electrode for the transistor 41 is coupled in parallel circuit relationship with a voltage dropping resistor 46 and to a diode 47. The resistor 46 is in turn connected to the positive terminal of the battery 22, while diode 47 has its anode connected to the emitter electrode and its cathode connected in common with the emitter circuits for the information amplifiers 1 through 8. The collector electrode of the transistor 41 is connected to the common line C of the cell 13 in common with the cathode of a diode 48 having its anode connected to the negative terminal of the battery 22 by means of the resistor 45. The diode 48 functions to limit the negative voltage of the common line C for the sensing element.

A further Zener diode 50 is connected to the common emitter circuits of the information amplifiers 1 through 8 with its anode connected to the positive terminal of the resistor 45. The Zener diode 50 functions to provide the above-mentioned negative or back-biasing voltage for the threshold resistor 21.

The resistors 32 and 33 provide for a threshold triggering level for the timing track holes $10^a$ in a manner similar to the threshold level provided by the resistor 21 for the information amplifiers 1 through 8. The base resistor 32 is shown as a variable resistor to allow an adjustment of the threshold and, therefore, the triggering level of the circuit 15 to compensate for the various light transmitting properties of the information tape 10 employed. This is a very simple adjustment.

With the above structure in mind, the operation of the timing control circuit will now be examined. It will be assumed that the information amplifiers 1 through 8 are normally back-biased, that is, are arranged to be non-conductive, and which biasing voltage in a practical embodiment utilizing 2N444A transistors is on the order of 6.0 volts. The bias potential provided by the Zener diodes 50 for the threshold resistor 21 is on the order of 5.1 volts. It will be further assumed that the resistor 32 has been adjusted in accordance with the light transmitting properties of the information tape 100 to provide the correct triggering level. The transistor 24 is normally non-conductive and the transistor 25 is normally arranged in a conductive condition, with the corresponding amplifiers 38 and 41 being rendered non-conductive.

As the information tape 10 is passed over the sensing means 13, the light from the source 14 passes therethrough and impinges on the individual sensing elements in accordance with the perforations recorded on the tape 10. It will be appreciated that regardless of the light transmitting properties of the tape 10, no output indications from the information amplifiers 1 through 8 will be provided during the intervals between recorded perforations due to the light transmitted through the tape. Each sensing element that receives a light signal then by means of a recorded perforation will provide the necessary current for overcoming the threshold bias of the resistor 21 and provide sufficient positive potential whereby the particular amplifier is back-biased by 5.50 volts, in our example. Since the information amplifiers are still back-biased, no output signals are provided at this time. However, while the sensing elements are generating this current, the feed sensing element also receives a light signal by means of the perforation $10^a$ and provides a corresponding signal to the base electrode of the transistor 24 of sufficient intensity to switch the conductive conditions of the transistors 24 and 25.

Specifically, the reception of the triggering signal from the feed sensing element causes the transistor 25 to become non-conductive, while the transistor 24 is rendered conductive. With the cutting off of the transistor 25, the amplifier 38 and, in turn, the amplifier 41 is rendered conductive. Since the collector circuit of the amplifier 41 is connected to the common line C of the sensing elements when a 2N525 transistor is employed, it raises this common line to a positive potential of approximately 0.5 volt with respect to the emitter of any information amplifier 1 through 8 whose sensing element has received an information signal. The transistors 24, 25, and 38 may be 2N444A transistors for this purpose. The output of these information amplifiers will then be on the order of minus 15 volts at 5 milliamperes. Therefore, the simultaneous occurrence of the information signal from a sensing element and the raising of the level of the common line C by the conduction of the amplifier 41 will only cause the corresponding information amplifier to be rendered conductive and thereby provide an output signal in response to the information signal. It should be noted that even though the potential of the common line C has been raised on all of the sensing elements, that the information amplifiers 1 through 8 that have not received a light signal by means of an information perforation will not be rendered conductive and, accordingly, the pattern of perforations and the absence of perforations is reproduced electrically in terms of an on-off pattern of signals that corresponds directly to the recorded perforation pattern. This arrangement then provides the simultaneous generation of output signals for any group of information signals in response to the timing signal generated from the sprocket feed perforations of the information tape 10. As the tape is continually advanced beyond the sensing member 13, the information amplifiers 1 through 8 are returned to their non-conductive condition and the triggering circuit 15 is also returned to its normal state of conduction. Upon the delivery of the adjacent group of perforations and timing signal therefor, the control circuit will respond once again to provide the pattern of output signals corresponding thereto in the same fashion as described hereinabove.

It therefore should be evident that the present invention has provided an improved record reader and, more particularly, a timing control circuit that allows the record reader to be utilized for reading "paper" tapes of varying light transmitting properties without producing erroneous output indications and which correct output signals are delivered substantially simultaneously in response only to the recorded perforations or information marks.

What is claimed is:

1. A reading control circuit for a record member comprising a record member having groups of information marks including a timing mark for each group of information marks, photovoltaic sensing means comprising a plurality of separate sensing elements arranged and spaced in accordance with the arrangement of information and timing marks, each of said sensing elements providing an electrical signal in response to light impinging thereon, circuit means connected to the sensing means for separately receiving the electrical signals corresponding to each sensed information mark and normally arranged in a non-conductive mode whereby an electrical signal of an amplitude greater than a predetermined threshold level corresponding to a sensed information mark from said sensing means in combination with a conditioning signal is necessary to render same conductive, and switching circuit means connected to the sensing means for receiving only the electrical signal corresponding to a sensed timing mark and switchable in response thereto, said switching circuit means being further connected to said circuit means to condition the conductivity thereof whereby said conditioned circuit means will provide simultaneous output signals corresponding only to each sensed information mark upon receiving said electrical signal representative of the sensed information mark.

2. A reading control circuit for a record member as defined in claim 1 wherein said switching circuit means comprises a Schmitt-type trigger circuit having a pair of transistors with one of their control electrodes connected in common with a Zener diode to provide a substantially constant input bias therefor before, after, and during the switching thereof whereby no tendency to oscillate occurs.

3. A reader comprising a record member having information channels and a timing channel coextensively arranged thereon and with the information recorded thereon in spaced groups transversely aligned relative to the information channels and which groups include information marks recorded in preselected channels, a timing mark arranged in the timing channel and aligned with each group of information marks, means for sensing all said channels substantially simultaneously and providing an electrical signal corresponding to each recorded information and timing mark upon the production of relative movement between said sensing means and said record member, means for producing relative movement between said sensing means and record member, separate amplifying means connected to receive each information signal from said sensing means, means for normally biasing each of said amplifiers to a non-conductive condition whereby a light signal above a predetermined threshold level corresponding to a sensed information mark is necessary to overcome the bias, and trigger circuit means connected to receive each timing signal from said sensing means and to provide a triggering signal in response thereto, said triggering signal being coupled to each of said amplifying means and proportioned to condition same to become conductive in response only to an information signal whereby each received information signal of the same group causes the corresponding amplifying means to conduct substantially simultaneously and the amplifying means not provided with an information signal is maintained in the non-conductive condition.

4. In a tape reader comprising an information tape including a timing channel with a plurality of spaced apart timing perforations recorded thereon and a plurality of information channels, the information being recorded in the channels by means of coded groups of perforations with each group substantially aligned with a timing perforation transversely of the tape, a plurality of sensing elements corresponding to each information and timing channel for generating an electrical signal in response to a light signal impinging thereon and mounted on one side of said tape, a light source mounted on the opposite side of said tape from said sensing elements to direct light onto the latter by means of the perforations, means for producing relative movement between said sensing elements and said tape for presenting different information groups to said sensing elements, an amplifying element connected to received the electrical signal from an individual sensing element and arranged to be conductively controlled thereby, means for normally biasing each of the amplifying elements in a non-conductive condition whereby a predetermined combination of a signal of a predetermined threshold level corresponding to a sensed information mark from a corresponding sensing element and a triggering signal are only effective to place said amplifying elements in a conductive condition, and trigger circuit means connected to be responsive to the signal generated by the sensing element for the timing channel and connected to each of said amplifying elements, said trigger circuit means being switchable in response to the electrical signal generated by the light passing only through the timing perforation onto the corresponding sensing element for conditioning each of the amplifying elements for the information sensing elements to become conductive substantially simultaneously in response only to a light signal above said predetermined level impinging on the corresponding information sensing element by means of an information perforation.

5. In a tape reader comprising an information tape including a timing channel with a plurality of spaced apart timing perforations recorded thereon and a plurality of information channels, the information being recorded in the channels by means of coded groups of perforations with each group substantially aligned with a timing perforation transversely of the tape, a plurality of sensing elements corresponding to each information and timing channel for generating an electrical signal in response to a light signal impinging thereon and mounted on one side of said tape, a light source mounted on the opposite side of said tape from said sensing elements to direct light onto the latter by means of the perforations, means for producing relative movement between said sensing elements and said tape for presenting different information groups to said sensing elements, an amplifying element connected to receive the electrical signal from an individual sensing element and arranged to be conductively controlled thereby, an impedance element connected to each amplifying element in parallel circuit relationship with the individual sensing element and arranged to normally maintain the amplifying element in a non-conductive condition and to establish a predetermined light level for the corresponding sensing element before it is effective to render said amplifying element conductive, and trigger circuit means connected to be responsive to the signal generated by the sensing element for the timing channel and connected to each of said amplifying elements, said trigger circuit means being switchable in response to the electrical signal generated by the light passing through the timing perforation onto the corresponding sensing element for conditioning each of the amplifying elements for the information sensing elements to become conductive susbtantially simultaneously in response to a light signal of a level above said predetermined level impinging on the corresponding information sensing element.

6. In a tape reader comprising an information tape including a timing channel with a plurality of spaced apart timing perforations recorded thereon and a plurality of information channels, the information being recorded in the channels by means of coded groups of perforations with each group substantially aligned with a timing perforation transversely of the tape, photovoltaic sensing means comprising a plurality of separate sensing elements arranged and spaced in accordance with the transverse arrangement of each of the information and timing channels on the tape, each of said sensing elements providing an electrical current in response to light impinging thereon, a separate amplifying element connected to receive the electrical signals from a corresponding one of the information sensing elements for responding thereto, separate impedance means connected to an individual amplifying element in parallel circuit relationship with the sensing elements for normally maintaining the amplifying element in a non-conductive condition, means connected to said impedance means for biasing each of said sensing elements through said impedance means to establish a threshold level of light therefor whereby the currents generated by said elements must be sufficient to override said bias before they may be effective on the corresponding amplifying element to render it conductive, trigger circuit means connected to be responsive to the electrical signal provided by the timing sensing element corresponding to a timing perforation and arranged to be switched thereby, and further amplifying means connected to be rendered conductive when the trigger circuit means is switched and connected to condition each of the information amplifiers to be conductive if they have received a signal above the threshold level corresponding to an information perforation.

7. In a tape reader as defined in claim 6, wherein said trigger circuit means comprises a Schmitt-type trigger circuit having a pair of transistors with their input circuits connected in common with a Zener diode for providing a substantially constant input bias therefor and the transistor that is connected to be responsive to the timing signal includes means for adjusting the switching level thereof.

References Cited by the Examiner

UNITED STATES PATENTS

| | | | |
|---|---|---|---|
| 2,624,786 | 1/53 | Potter | 178—17 |
| 2,688,049 | 8/54 | Pollard et al. | 235—61.11 |
| 2,894,248 | 7/59 | Relis et al. | 235—61.11 |
| 2,921,736 | 1/60 | Hatherell et al. | 235—61.11 |
| 2,924,754 | 2/60 | Mead | 250—211 |
| 2,933,245 | 4/60 | Fitch et al. | 235—61.11 |
| 2,939,018 | 5/60 | Faulkner | 307—88.5 |
| 2,964,655 | 12/60 | Mann | 307—88.5 |
| 2,965,768 | 12/60 | Wanlass | 307—88.5 |
| 3,109,933 | 11/63 | Baumann | 235—61.11 |

MALCOLM A. MORRISON, *Primary Examiner.*

WALTER W. BURNS, Jr., *Examiner.*

UNITED STATES PATENT OFFICE

CERTIFICATE OF CORRECTION

Patent No. 3,198,935

August 3, 1965

George W. Floyd

It is hereby certified that error appears in the above numbered patent requiring correction and that the said Letters Patent should read as corrected below.

Column 4, lines 14 and 15, strike out "relative to the amount of light impinging on the sensing elements" and insert instead -- 15 due to the capacitance that is exhibited by the sensing elements --; column 5, line 57, for "100" read -- 10 --.

Signed and sealed this 8th day of February 1966.

SEAL)

ıttest:

ʹRNEST W. SWIDER

.ttesting Officer

EDWARD J. BRENNER

Commissioner of Patents